United States Patent
Shriver

[15] 3,679,015
[45] July 25, 1972

[54] CONTROL FOR A DIFFERENTIALLY STEERED VEHICLE

[72] Inventor: Joe E. Shriver, Leganon, Ohio
[73] Assignee: Sperry Rand Corporation, New Holland, Pa.
[22] Filed: Sept. 28, 1970
[21] Appl. No.: 76,117

[52] U.S. Cl. ................................180/6.2, 74/471, 74/496
[51] Int. Cl. ..............................................B62d 11/08
[58] Field of Search ............180/6.2, 6.32, 6.34, 6.36, 180/6.4, 6.48, 6.7; 74/471, 496; 192/13 R

[56] References Cited

UNITED STATES PATENTS

| | | | |
|---|---|---|---|
| 1,774,451 | 8/1930 | Norelius | 180/6.2 |
| 2,757,373 | 7/1956 | Marrie | 180/6.2 X |
| 1,157,319 | 10/1915 | Maniscalco | 180/6.32 |
| 1,364,767 | 1/1921 | Kemper | 180/6.34 |
| 3,362,493 | 1/1968 | Davis et al. | 180/6.32 |
| 1,752,209 | 3/1930 | Smith | 74/471 X |

FOREIGN PATENTS OR APPLICATIONS

| | | | |
|---|---|---|---|
| 881,621 | 1/1943 | France | 180/6.32 |
| 160,051 | 3/1921 | Great Britain | 180/6.4 |

*Primary Examiner*—Benjamin Hersh
*Assistant Examiner*—Leslie J. Paperner
*Attorney*—Joseph A. Brown, John C. Thompson, James J. Kennedy

[57] ABSTRACT

A control mechanism for disengaging the clutch and applying the brake to the wheels on one side of a differentially steered vehicle. The mechanism includes two control cables, each of the control cables being connected to the clutch and brake assembly within the drive line for the drive wheels on one side of a differentially steered vehicle. In the drive line illustrated each control cable will, when initially actuated, disengage a clutch in said drive line and, upon further actuation, apply a brake to said drive line. The actuating mechanism includes an actuator secured to a rotatable shaft, the actuator having an axially extending lug which is disposed between two arms. The arms are journalled about the shaft at one end and connected to an associated control cable at the other end. Each of the arms is normally biased against a stop by the associated control cable, each of which is spring biased away from the arm. Rotation of the actuator will cause the lug to contact one of the arms, forcing it away from the stop and in turn actuating its associated control cable.

5 Claims, 2 Drawing Figures

Patented July 25, 1972

3,679,015

INVENTOR
JOE E. SHRIVER
BY
John C. Thompson
ATTORNEY

CONTROL FOR A DIFFERENTIALLY STEERED VEHICLE

FIELD OF THE INVENTION

This invention relates generally to a control, and more particularly to a control for a differentially steered vehicle such as, for example, a six wheeled all terrain vehicle.

DESCRIPTION OF THE PRIOR ART

In recent years off the road recreational vehicles have obtained a certain degree of popularity. One form of these vehicles is commonly referred to as an all terrain vehicle and customarily has a body supported by six high floatation, low pressure tires, three on each side. The wheels on each side are driven together and, in most forms of these vehicles the vehicle is steered by decreasing the rotational speed on one set of wheels, that is the wheels on one side of the vehicle, while maintaining original speed on the other side of the vehicle. The sets of wheels of the all terrain vehicles may be driven through either hydrostatic drives or through mechanical means, however this invention has particular application to mechanically driven all terrain vehicles. While different forms of final drives to the wheels are employed it should be noted that, in all commercially available machines with which applicant is familiar, the vehicle is steered by slowing and or stopping one set of wheels without increasing the speed of the other set of wheels. This slowing down and stopping is accomplished by braking the drive line to one set of wheels and, in some instances, also declutching the drive line to that set prior to the time that the brakes are applied.

The most common form of control for the right and left drive lines is a pair of independently actuated handles which project upwardly from the floor of the vehicle in front of the operator. When both of these handles are in their full forward position there is no braking and/or declutching action to either the right or the left drive line. However, by pulling back on one of these handles the operator may initially declutch the drive to the set of wheels associated with that handle and subsequently, upon further actuation of the handle, progressively apply the brake for that set of wheels. The actuating handles are connected with the clutch and/or brake by conventional linkages. While this form of control is generally satisfactory it should be noted that most operators have difficulty in familiarizing themselves with this form of control since they are more accustomed to a conventional steering wheel.

In one of the commercially available machines a steering wheel is provided. In this vehicle the steering wheel controls the right and left clutching and/or braking units by right and left master and slave cylinder assemblies. This design has the disadvantage of its relatively high cost. Furthermore, it is relatively difficult to service.

SUMMARY OF THE INVENTION

It is an object of this invention to provide a control means for a differentially steered vehicle in which a steering wheel may be employed to actuate right and left clutching and/or braking mechanisms through means of a relatively simple mechanical transmission.

It is a further object of the present invention to provide a control for right and left control cables which may be alternately actuated by a rotatable control device.

Another object of the present invention is to provide a control for an all terrain vehicle which is relatively inexpensive, easy to service, and having few moving parts subject to failure. A further object of this invention is to provide a relatively simple control device for a mechanically driven all terrain vehicle which can be actuated by a steering wheel.

The above objects and other objects and advantages of this invention are obtained by providing two control arms which are journalled about a common shaft at one end and connected to a control cable at the other end which normally spring biases the arms against a stop. The arms are swung away from the stop by an actuating member fixed to the shaft and projecting between the arms so that upon rotation of the shaft the actuator will contact either one or the other of the arms and move it away from the stop. This control will be more fully understood after a consideration of the following detailed description, taken in conjunction with the accompanying drawings in which a preferred form of this invention is illustrated.

DESCRIPTION OF THE PREFERRED EMBODIMENT

Figure 1:
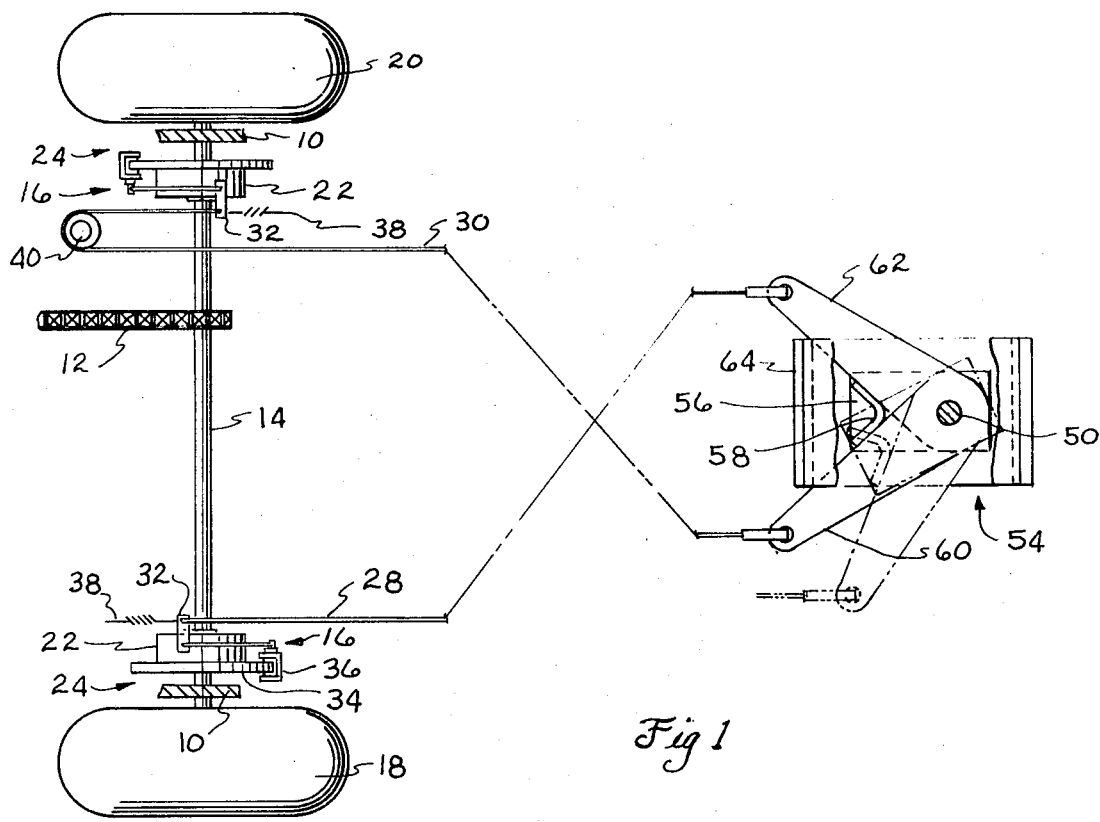
FIG. 1 is a diagrammatic plan view of the control applied to a differentially steered vehicle such as an all terrain vehicle.
Figure 2:
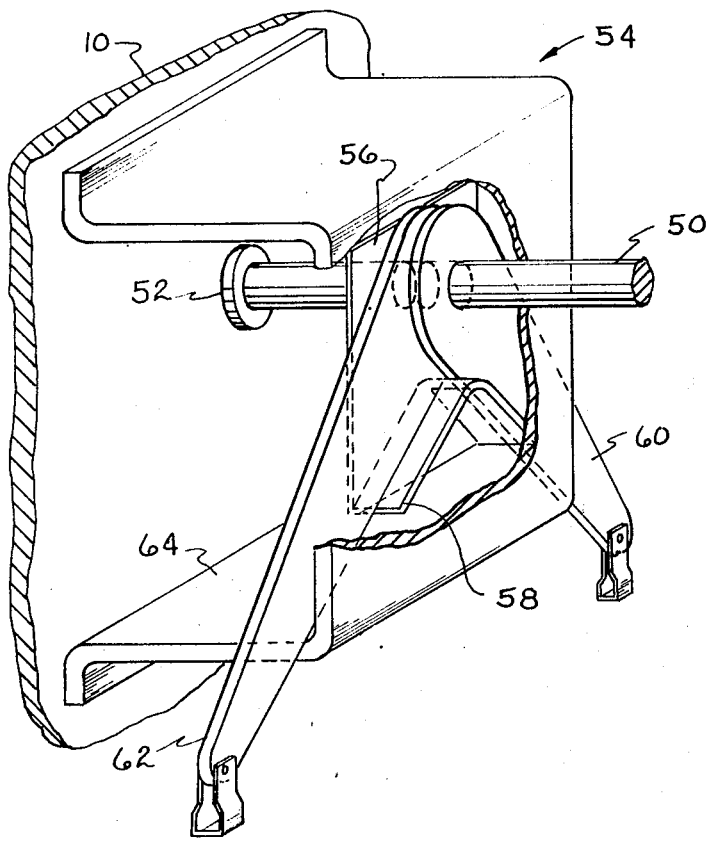
FIG. 2 is a perspective view showing the control assembly which is adapted to actuate either one or the other of two control cables.

Referring now to the drawings, the principles of this invention are adapted to be applied to an all terrain vehicle having a body 10 which is supported on right and left hand sets of wheels, only one wheel of each set being illustrated in FIG. 1. The wheels are driven from an engine through a variable speed drive and a forward reverse transmission which in turn drives a drive chain 12. The drive chain is in turn connected to a sprocket mounted on a rotatable drive shaft 14. The drive shaft extends across the vehicle and is connected at its right and left hand ends to coupling means 16 which in turn interconnect the drive shaft 14 with either the right drive wheels 18 or the left drive wheels 20. The coupling means 16 includes a clutch 22 and a disc brake 24.

First and second control cables 28,30 are provided, each of the control cables having one end connected to a lever 32 which will, when initially actuated, disengage the associated clutch, and, upon further actuation, cause the disc 34 of the associated disc brake assembly 24 to be engaged by the caliper 36. In the normal position, that is the position in which the drive shaft 14 is operatively coupled to the wheels 18 and 20 the cables 28 and 30 are biased to their operative position by means of a tension spring 38. One end of the spring 38 is anchored to the body, or suitable structure supported on the body, and the other end is connected to the lever 32 or the end of the cable 28,30.

As can be seen from FIG. 1 identical clutch and brake assemblies may be used for the right and left hand drives. To accomplish this identity of components it is necessary to reverse the brake and clutch. Thus, to disengage the right hand clutch and to engage the right hand brake it is necessary to pull the lever in the forward direction, that is to the right as viewed in FIG. 1. However, to disengage the clutch and apply the left hand brake it is necessary to pull the lever 32 to the rear. To accomplish this the cable 30 is disposed over a sheave 40.

The actuating mechanism for the cables includes a rotatable shaft 50 to which a steering wheel (not shown) may be secured. The shaft 50 has one end journalled in a bearing block 52 mounted on the body and another portion is journalled within a U shaped member 54. Fixed to the shaft is an actuator member 56 which projects rearwardly towards the drive lines for the right and left wheels. The actuator member carries a V shaped projection or lug 58 which is disposed between right and left rearwardly extending arms 60,62, respectively. The forward portion of each of the arms is journalled about the shaft 50. The rearward end of each of the arms is secured in a conventional manner to the forward end of one of the control cables 28,30, and the control cable spring biases the arms against the stop formed by the rearward leg 64 of the U shaped member.

OPERATION

When the vehicle is to be turned to either the right or the left the rotatable shaft 50 is turned from a centered position in the same direction by the steering wheel (not shown). Thus, when it is desired to turn the vehicle towards the left the shaft is turned counter-clockwise. This will cause the lug or V shaped projection 58 on the actuator 56 to contact the right hand arm 60 and to move it away from the stop formed by the rearward leg 64 of the U shaped member 54. As the right hand arm is moved forward it will pull the control cable 30, to which it is secured, in the forward direction to a position indicated by the broken lines in FIG. 1. As the arm moves forward the cable 30 will pull the lever 32 to the rear initially disengaging the clutch 22, and, upon further movement, applying the brake 24. During the initial movement of the arm the wheels 20 will tend to slow down causing the vehicle to slowly turn to the left as the wheels 18 will be moving at a faster speed. Continued movement of the cable will gradually apply the brake causing faster turning as the differential speed between the wheels 18 and 20 is increased.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A control for differentially steered vehicle of the class described comprising: first and second control cables, a U-shaped mounting bracket, a rotatable shaft journalled in said bracket, first and second swingable arm means, said arm means being connected at one end to said first and second cable means, a portion of said mounting bracket being interposed between said arm means and acting as stop means, means biasing said arm means towards said stop means, and an actuator fixed to said shaft, said actuator mechanism having lug means disposed between said arm means and operable upon rotation of said shaft to contact one or the other of said arm means to swing it away from said stop.

2. The control for a differentially steered vehicle set forth in claim 1 in which said means biasing said arm means against towards said stop means comprises first and second tension springs connected respectively to said first and second control cables at an end remote from said arm means, said springs normally causing said cables to pull the arm means against said stop means.

3. The control for a differentially steered vehicle set forth in claim 1 in which said arm means are rotatably journalled about the said shaft.

4. A control for a differentially steered vehicle having right and left ground engaging wheel means, a common drive for said right and left ground engaging wheel means, and first and second coupling means operable to drivingly interconnect the drive means with said right and left ground engaging wheel means, respectively, said first and second coupling means each including a clutch, a brake, and an actuatable lever operatively interconnected with said clutch and said brake and operable upon actuation to initially disengage said clutch, and upon further actuation to gradually apply said brake; the combination therewith of first and second cable means, each of said cable means having one end connected to the lever means of said first and second coupling means, respectively, a shaft rotatably journalled in a U-shaped mounting bracket and disposed in a centered position during straight ahead movement of said vehicle, first and second swingable arms each being connected to one of said first and second control cables, respectively, a portion of said mounting bracket being disposed between said swingable arms and acting as stop means, means normally biasing said arms against said stop means, and an actuator mounted on said rotatable shaft and disposed between said arms and operable upon initial rotation of said shaft away from said centered position to swing one of said arms away from said stop thereby causing said lever means to be actuated to initially disengage one of said clutches, and, upon further rotation of said shaft, to gradually apply the brake associated with said one clutch.

5. The control for a differentially steered vehicle set forth in claim 4 in which said biasing means comprises a pair of tension springs connected to the end of each of said first and second cables remote from said arms.

* * * * *